(12) United States Patent
Weissman et al.

(10) Patent No.: US 6,501,942 B1
(45) Date of Patent: Dec. 31, 2002

(54) IN-BUILDING RADIO-FREQUENCY COVERAGE

(75) Inventors: Haim Weissman, Haifa (IL); Eli Yona, Binyamina (IL)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/430,616

(22) Filed: Oct. 29, 1999

(51) Int. Cl.[7] .................................................. H04B 3/36
(52) U.S. Cl. .......................................... 455/14; 455/20
(58) Field of Search ................................. 455/7, 14, 15, 455/16, 20, 561, 562; 370/315; 375/211, 212

(56) References Cited

U.S. PATENT DOCUMENTS

| | | |
|---|---|---|
| 4,901,307 A | 2/1990 | Gilhousen et al. ............. 370/18 |
| 5,046,135 A | 9/1991 | Hatcher ....................... 455/303 |
| 5,404,570 A | 4/1995 | Charas et al. |
| 5,513,176 A | 4/1996 | Dean et al. |
| 5,603,080 A | 2/1997 | Kallander et al. ............ 455/14 |
| 5,765,099 A | 6/1998 | Georges et al. ................ 455/14 |
| 5,930,682 A * | 7/1999 | Schwartz et al. ............. 455/14 |
| 6,032,020 A | 2/2000 | Cook et al. ..................... 455/7 |

FOREIGN PATENT DOCUMENTS

| | | | | |
|---|---|---|---|---|
| EP | 0386874 | 1/1990 | ............ | H04B/7/24 |
| WO | 9823116 | 5/1998 | ............ | H04Q/7/36 |

* cited by examiner

*Primary Examiner*—Lee Nguyen
(74) *Attorney, Agent, or Firm*—Philip Wadsworth; Charles D. Brown; Kevin T. Cheatham (57) ABSTRACT

Repeater apparatus for conveying a radio-frequency (RF) signal into an environment closed-off to the RF signal, including a master transceiver unit having a master port which receives the RF signal, a local oscillator (LO), which generates a LO signal at a LO frequency, and a frequency divider which divides the LO frequency of the LO signal by an integer to produce a divided LO signal. The master transceiver unit also includes a master mixer coupled to the master port and the divider which generates an intermediate-frequency (IF) signal responsive to the RF signal and the LO signal. The apparatus includes one or more slave transceiver units, each unit positioned within the environment closed-off to the RF signal and including a frequency multiplier which generates a recovered LO signal at the LO frequency by multiplying the frequency of the divided LO signal by the integer, a slave mixer coupled to the multiplier which generates a recovered RF signal responsive to the recovered LO signal and the IF signal, and a slave port coupled to the slave mixer which receives the recovered RF signal therefrom and transmits the recovered RF signal into the closed-off environment. The apparatus further includes one or more cables coupled between the master transceiver unit and the one or more slave transceiver units which convey the IF signal and the divided LO signal between the master transceiver unit and the one or more slave transceiver units.

22 Claims, 8 Drawing Sheets

IN-BUILDING RADIO-FREQUENCY COVERAGE

BACKGROUND OF THE INVENTION

I. Field of the Invention

The present invention relates generally to cellular communication systems, and specifically to cellular communication systems for areas where radio-frequency signals have difficulty entering.

II. Description of the Related Art

In cellular communications systems there are typically regions where the coverage is difficult or incomplete, for example, within metal-framed structures and underground. One of the reasons for the difficult coverage is Faraday-cage type shielding, wherein radio frequency (RF) signals have difficulty penetrating an effectively closed conducting structure. Another reason is Rayleigh fading, which is generated by a signal traversing multiple paths between a transmitter and a receiver. Typically the multiple paths are caused by reflections and/or refractions of the signal by objects between the transmitter and the receiver. The multiple paths followed by the signal generate interference effects at the receiver, which effects manifest themselves as differences in measured signal strength at the receiver, the measured signal strength being a function of the different paths followed by the signal. Methods for improving the coverage in regions where Faraday-cage type shielding and Rayleigh fading occur are known in the art.

U.S. Pat. No. 5,404,570, to Charas et al, whose disclosure is incorporated herein by reference, describes a repeater system used between a base transceiver station (BTS) which is able to receive signals and a closed environment such as a tunnel, wherein the environment is closed off to transmissions from the BTS. The system down-converts a high radio-frequency (RF) signal from the BTS to an intermediate-frequency (IF) signal, which is then radiated by a cable and an antenna in the closed environment to a receiver therein. The receiver up-converts the IF signal to the original RF signal. Systems described in the disclosure include a vehicle moving in a tunnel, so that passengers in the vehicle who would otherwise be cut off from the BTS are able to receive signals.

U.S. Pat. No. 5,603,080 to Kallandar et al., whose disclosure is incorporated herein by reference, describes a plurality of repeater systems used between a plurality of BTSs and a closed environment, wherein the environment is closed off to transmissions from the BTSs. Each system down-converts an RF signal from its respective BTS to an IF signal, which is then transferred by a cable in the closed environment to one or more respective receivers therein. Each receiver up-converts the IF signal to the original RF signal. Systems described in the disclosure include a vehicle moving between overlapping regions in a tunnel, each region covered by one of the BTSs via its repeater system. Thus passengers in the vehicle who would otherwise be cut off from one or more of the BTSs are able to receive signals from at least one of the BTSs throughout the tunnel.

U.S. Pat. No. 5,765,099, to Georges et al., whose disclosure is incorporated herein by reference, describes a system and method for transferring an RF signal between two or more regions using a low bandwidth medium such as twisted pair cabling. In a first region the RF signal is mixed with a first local oscillator to produce a down-converted IF signal. The IF signal is transferred to a second region via the low bandwidth medium, wherein the signal is up-converted to the original RF signal using a second local oscillator. The local oscillators are each locked by a phase locked loop (PLL) in each region to generate the same frequency, the locking being performed in each loop by comparing the local oscillator frequency with a single low frequency stable reference signal generated in one region. The reference signal is transferred between the regions via the low bandwidth medium.

One of the methods for overcoming Rayleigh fading, is to use a plurality of spatially-diverse receiving antennas, relying on the fact that statistically the chance of destructive interference occurring at all the antennas for a given signal is small. Using a plurality of antennas (in many cases two antennas are sufficient) enables a corresponding diversity of received signals to be analyzed, and typically the strongest signal is chosen. In the case of two antennas, the received signals are referred to as main and diversity signals.

U.S. Pat. No. 5,513,176, to Dean et al., whose disclosure is incorporated herein by reference, describes a distributed antenna array within a region where reception is difficult. The performance of the antenna array is enhanced by utilizing the signal diversity which is generated by the antennas being spatially distributed. Each antenna has a differential time delay applied to signals received by the antennas, so that the diverse signals are also separated in time. The differentially-delayed signals are preferably down-converted to an intermediate frequency and are combined, and the combined signal is then transferred out of the region via a cable.

SUMMARY OF THE INVENTION

It is an object of some aspects of the present invention to provide methods and apparatus for improved coverage in regions where cellular communication is inherently difficult.

In preferred embodiments of the present invention, repeater apparatus for use in a cellular communications system comprises a master transceiver unit, which communicates, preferably over the air or alternatively via a cable, with a base transceiver station using master radio-frequency (RF) signals. The master transceiver unit is coupled by one or more cables to one or more slave transceiver units, which are situated in an environment substantially closed off electromagnetically from the environment wherein the base transceiver station is situated. The slave units comprise respective slave antennas, by means of which the slave units communicate with mobile cellular transceivers using slave RF signals. Most preferably, the slave units are located in a region where the master RF signals are not able to penetrate, such as within a building. Signals between the master unit and the slave units are transferred at intermediate frequencies (IF) via the cables.

In both master and slave units, the IF signals are generated by down-converting the respective RF signals, and the RF signals are recovered by up-converting the IF signals. The up-conversion and down-conversion are performed using the same local oscillator (LO) frequency in the master and the slave units. In order to generate the same LO frequency in all units, one local oscillator in the master unit generates the LO frequency, and the generated LO frequency is divided by an integer in the master unit. The divided LO signal is transferred by the cable to the slave units, wherein the divided LO signal is multiplied by the same integer to recover the LO frequency.

Transferring an integer-divided LO frequency throughout the system, for use as a reference, enables recovery of the undivided LO frequency by multiplying by the same integer.

Furthermore, the integer-divided LO signal can be distributed with low loss over conventional, inexpensive cable. Thus, one local oscillator supplies the entire system with the same LO frequency, so that problems which might be caused by LO frequency differences within the system are obviated.

In some preferred embodiments of the present invention, the RF signals comprise code division multiple access (CDMA) signals, which include one or more pilot signals associated with cellular channels over which the mobile transceivers are to communicate. The slave units comprise respective transmission delay elements which add a differential time delay to signals transmitted from the master unit to the respective slave units. The differential time delay effectively adds diversity to the signals received by the slave units, so that reception of pilot tone signals transmitted by the master unit is improved. In some preferred embodiments of the present invention, the slave units comprise respective receive delay elements, which add a differential time delay to signals received by the master unit from the respective slave units, so that reception of signals from the slave units is improved.

In some preferred embodiments of the present invention, the local oscillator generating the particular LO frequency is not necessarily a high-stability oscillator, since any variations in the LO frequency are transferred throughout the system.

In some preferred embodiments of the present invention, a plurality of master units communicate with a respective plurality of groupings of one or more slave units, each master and slave grouping operating substantially as described hereinabove. Preferably, the plurality of master units (and their respective slave units) utilize the same LO frequency to generate the IF frequencies used for master-slave communication. Alternatively, each master unit and its respective slave units utilize different LO frequencies. By dividing the slave units among the master units, an overall noise figure of the system is reduced. Most preferably, at least some of the slave units provide signals which are used as diverse receive signals, so that overall reception by the slave units is improved.

In some preferred embodiments of the present invention, the system operates as a channelized repeater system transferring channelized signals between the master and slave units. Most preferably, one or more filters are placed within the one or more slave units or one or more master units for the purpose of filtering out unwanted signals, for example signals outside specific channels which are designated to be transferred between the master and slave units.

There is therefore provided, in accordance with a preferred embodiment of the present invention, repeater apparatus for conveying a radio-frequency (RF) signal into an environment closed-off to the RF signal, including:

a master transceiver unit, including:

a master port which receives the RF signal;

a local oscillator (LO), which generates a LO signal at a LO frequency;

a frequency divider which divides the LO frequency of the LO signal by an integer to produce a divided LO signal; and a master mixer coupled to the master port and the divider which generates an intermediate-frequency (IF) signal responsive to the RF signal and the LO signal;

one or more slave transceiver units, each unit positioned within the environment closed-off to the RF signal and including:

a frequency recovery circuit, preferably a frequency multiplier, which generates a recovered LO signal at the LO frequency by multiplying the frequency of the divided LO signal by the integer;

a slave mixer coupled to the multiplier which generates a recovered RF signal responsive to the recovered LO signal and the IF signal; and a slave port coupled to the slave mixer which receives the recovered RF signal therefrom and transmits the recovered RF signal into the closed-off environment; and one or more cables coupled between the master transceiver unit and the one or more slave transceiver units which convey the IF signal and the divided LO signal between the master transceiver unit and the one or more slave transceiver units.

Preferably, the master port is a two-way port, and each slave port is a two-way port through which the respective slave transceiver unit receives an RF slave signal from the closed-off environment and mixes the RF slave signal with the recovered LO signal to produce a slave IF signal which is conveyed by the one or more cables to the master transceiver unit, wherein a recovered slave RF signal is generated and is conveyed to the master port for transmission therefrom.

Preferably, each slave transceiver unit includes a respective IF signal reverse path wherein the reverse path comprises a delay element which delays the IF signal in the reverse path by a predetermined time.

Preferably, the master transceiver unit includes an antenna which receives the RF signal from a base transceiver station and transfers the received RF signal to the master port.

Preferably, the master port receives the RF signal via a cable coupled to a base transceiver station.

Further preferably, each slave unit includes one or more antennas coupled to the respective slave port which transmit the recovered RF signal into the closed-off environment.

Preferably, the master unit transceiver includes a DC power supply which generates a DC level that is conveyed over the one or more cables to power the one or more slave transceiver units.

Preferably, the master unit transceiver includes a controller which controls the operation of the master transceiver unit and the one or more slave transceiver units.

Further preferably, the repeater apparatus includes a remote control unit which transfers control signals between the controller and an operator of the apparatus.

Further preferably, the controller generates modulated control signals which are conveyed by the one or more cables between the master transceiver unit and the one or more slave transceiver units.

Preferably, the apparatus operates in a cellular communications network at frequencies substantially in the range 800 MHz to 1900 MHz.

Preferably, the IF signal corresponds to one or more predetermined channels of a multiple-access communications network.

Preferably, the one or more slave transceiver units include a plurality of slave transceiver units coupled to the master transceiver unit in one or more daisy-chain topologies.

Further preferably, the one or more slave transceiver units include a plurality of slave transceiver units coupled to the master transceiver unit in one or more star topologies.

Preferably, the one or more slave transceiver units include a plurality of slave transceiver units coupled to the master transceiver unit in one or more hybrid star-daisy-chain topologies.

Preferably, each slave transceiver unit includes a respective IF signal forward path, wherein the forward path includes a delay element which delays the IF signal in the forward path by a predetermined time.

There is further provided, in accordance with a preferred embodiment of the present invention, a method for conveying a radio-frequency (RF) signal into an environment closed-off to the RF signal, including:

receiving the RF signal at a master port;

providing a local oscillator (LO) signal operating at a LO frequency in a vicinity of the master port;

dividing the LO frequency of the LO signal by an integer to produce a divided LO signal;

generating an intermediate frequency (IF) signal responsive to the RF signal and the LO signal;

conveying the IF signal and the divided LO signal to the closed-off environment;

multiplying the frequency of the divided LO signal by the integer to generate a recovered LO signal having the LO frequency;

mixing the recovered LO signal and the IF signal to generate a recovered RF signal;

coupling the recovered RF signal to a slave port; and transmitting the recovered RF signal into the closed-off environment from the slave port.

Preferably, the method includes:

receiving a slave RF signal from the closed-off environment at the slave port;

mixing the slave RF signal and the LO signal to produce a slave IF signal;

recovering the slave RF signal by mixing the slave IF signal with the LO signal; and transmitting the slave RF signal from the master port.

Preferably, receiving the RF signal includes receiving a cellular communications transmission at a frequency in the range 800 MHz to 1900 MHz.

Preferably, generating the IF signal includes producing an IF signal having a frequency substantially less than the frequency of the RF signal.

Further preferably, generating the IF signal includes producing an IF signal having a frequency substantially less than the LO frequency.

Further preferably, generating the IF signal includes producing an IF signal to correspond to one or more predetermined channels of a multiple-access communications network.

Preferably, conveying the IF signal to the closed-off environment includes delaying the IF signal by a predetermined time.

Preferably, mixing the slave RF signal and the LO signal to produce a slave IF signal includes delaying the slave IF signal by a predetermined time.

There is further provided, in accordance with a preferred embodiment of the present invention a communications repeater system that includes a plurality of slave units, which receive a main radio frequency (RF) signal and a diversity RF signal transmitted by one or more mobile communication units in a vicinity of the slave units and which generate, responsive to the received RF signals, a respective main intermediate frequency (IF) signal and diversity IF signal, apparatus for converting the IF signals to respective recovered main and recovered diversity radio-frequency (RF) signals, including:

a main master unit, including:
a main IF port which receives the main IF signal;
a local oscillator which generates a local oscillator (LO) signal;
a reference signal generator, coupled to the local oscillator, which generates a reference signal responsive to the LO signal;
a main mixer coupled to the main IF port and the local oscillator which generates the recovered main RF signal responsive to the main IF signal and the LO signal; and
a main RF port coupled to the main mixer which transmits the recovered main RF signal; and a diversity master unit, including:
a diversity intermediate frequency (IF) port which receives the diversity IF signal;
a receiver which generates a recovered LO signal from the reference signal received from the main master unit;
a diversity mixer coupled to the diversity IF port and the receiver which generates a recovered diversity RF signal responsive to the diversity IF signal and the recovered LO signal; and
a diversity RF port coupled to the diversity mixer which transmits the recovered diversity RF signal.

Preferably, the reference signal generator includes a frequency divider, which divides a frequency of the LO signal by an integer to produce a divided LO signal, and the receiver includes a multiplier which multiplies the divided LO signal by the integer to generate the recovered LO signal.

Preferably, the reference signal includes the LO signal, and the receiver includes a splitter which receives the LO signal and splits the LO signal to generate the recovered LO signal.

Preferably, each slave unit includes a respective IF signal forward path, wherein the forward path includes a delay element which delays the IF signal in the forward path by a predetermined time.

Further preferably, each slave unit includes a respective IF signal reverse path, wherein the reverse path includes a delay element which delays the IF signal in the reverse path by a predetermined time.

Preferably, the plurality of slave units includes:
one or more main slave units coupled to the main IF port which receive the main RF signal and generate the main IF signal responsive to the LO signal and the main RF signal; and
one or more diversity slave units coupled to the diversity RF port which receive the diversity IF signal and generate the diversity IF signal responsive to the LO signal and the diversity RF signal.

Preferably, the one or more main slave units are separated sufficiently in position from the one or more diversity slave units so that the main RF signal received by the one or more main slave units and the diversity RF signal received by the one or more diversity slave units are distinguishable from each other by the one or more main slave units and the one or more diversity slave units.

Preferably, the system includes an antenna coupled to the main RF port and the diversity RF port which radiates the main recovered RF signal and the diversity recovered RF signal.

Further preferably, the system includes a cable coupled to the main RF port and the diversity RF port which conveys the main recovered RF signal and the diversity recovered RF signal to a base transceiver station.

There is further provided, in accordance with a preferred embodiment of the present invention, a communications repeater system that includes a plurality of slave units, which receive a main radio frequency (RF) signal and a diversity RF signal transmitted by one or more mobile communication units in a vicinity of the slave units and which generate, responsive to the received RF signals, a respective main intermediate frequency (IF) signal, and diversity IF signal, a method for converting the main and diversity IF signals to respective recovered main and recovered diversity radio-frequency (RF) signals, including:

receiving the main IF signal generated responsive to the main RF signal in a main IF port;

generating a local oscillator (LO) signal;

mixing the main IF signal and the LO signal to generate a recovered main RF signal;

transmitting the recovered main RF signal from a main RF port;

receiving the diversity IF signal generated responsive to the diversity RF signal at a diversity IF port;

generating a reference responsive to the LO signal;

receiving the reference to generate a recovered LO signal;

mixing the diversity IF signal and the recovered LO signal to generate a recovered diversity RF signal; and     radiating the recovered diversity RF signal from a diversity RF port.

Preferably, generating the reference includes dividing a frequency of the LO signal by an integer to produce a divided LO signal, and receiving the reference includes multiplying the frequency of the divided LO signal by the integer.

There is further provided, in accordance with a preferred embodiment of the present invention, repeater apparatus, including:

first and second master units, which communicate with respective first and second wireless communication networks operating on respective first and second frequency bands;

a combiner, in wired communication with the first and second master units, so as to receive therefrom and convey thereto communication signals that are transmitted over the first and second networks; and     a plurality of slave units, coupled to the combiner, and located at a plurality of different, respective locations within a generally closed environment, so as to communicate with mobile wireless units operating on the first and second frequency bands.

Preferably, the first frequency band includes frequencies substantially in a range 800 MHz to 900 MHz and the second frequency band includes frequencies substantially in a range 1800 MHz to 1900 MHz.

Preferably, the plurality of slave units includes at least one slave unit operating on the first frequency band and at least one slave unit operating on the second frequency band.

Preferably, the repeater apparatus includes one or more antennas coupled at least to the first or the second master unit via which the respective master unit communicates with the respective wireless communication network.

Further preferably, the repeater apparatus includes a cable coupled to at least the first or the second master unit via which the respective master unit communicates with the respective wireless communication network.

Preferably, the first wireless communication network includes a cellular network, and the second wireless communication network includes a Personal Communication Services (PCS) network.

The present invention will be more fully understood from the following detailed description of the preferred embodiments thereof, taken together with the drawings, in which:

DETAILED DESCRIPTION OF THE INVENTION

Figure 1:
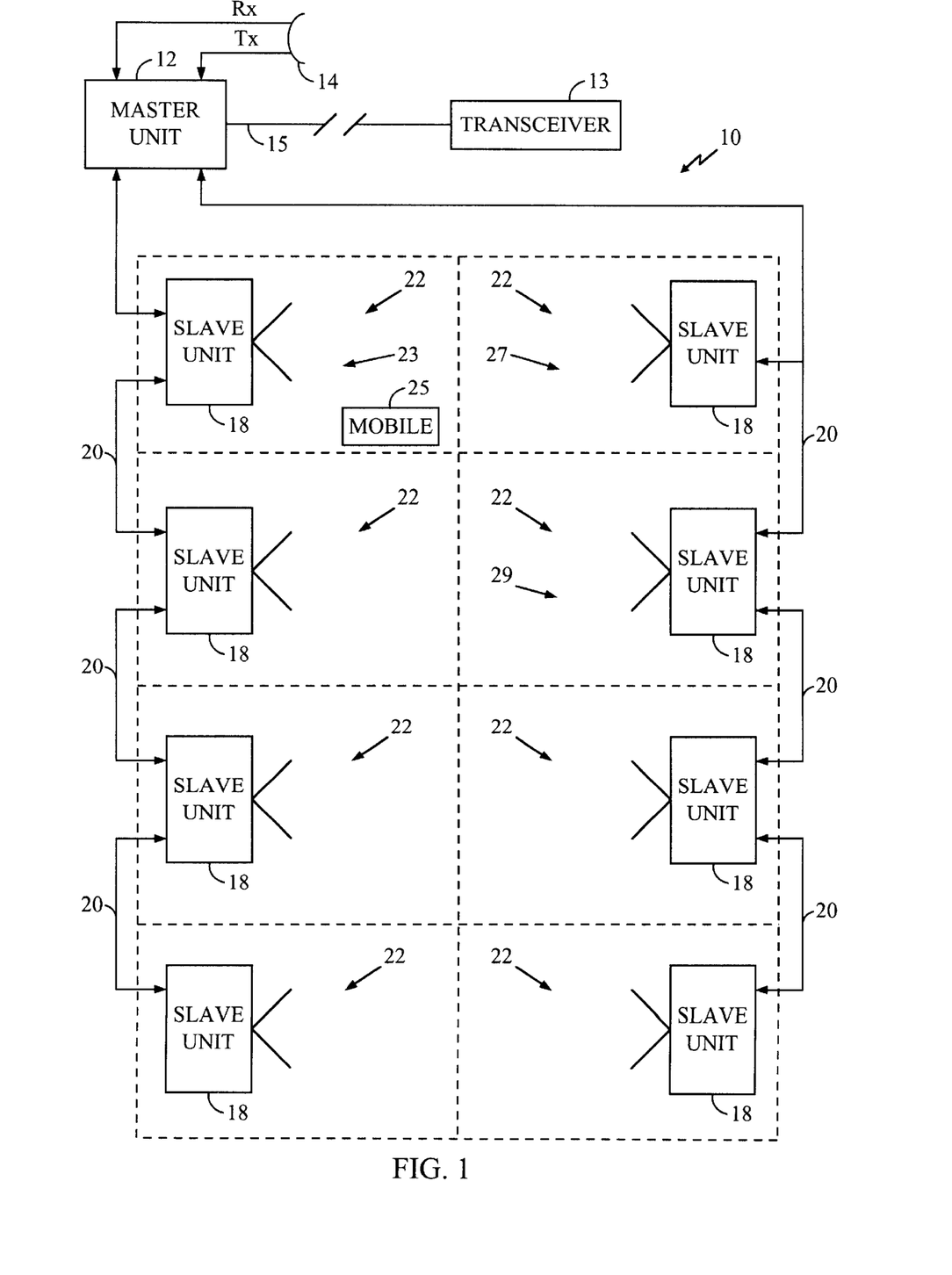
FIG. 1 is a schematic block diagram of an in-building repeater system, according to a preferred embodiment of the present invention.

Reference is now made to FIG. 1, which schematically illustrates an in-building repeater system 10, according to a preferred embodiment of the present invention. A master cellular (hereinafter referred to as CELL) antenna 14 receives a master CELL radio-frequency (RF) signal from a remote transceiver 13. Antenna 14 is most preferably positioned outside a building 16, so that signals may be transmitted between the antenna and transceiver 13 generally without hindrance. Transceiver 13 is preferably a transceiver in a base transceiver station (BTS) of a cellular telephone system operating in a frequency band in a range of approximately 820 MHz to 880 MHz, although any other suitable transceiver could also be used. The master RF signal is transferred from antenna 14 to a master CELL unit 12 by methods which are known in the art. Alternatively, master CELL unit 12 transmits RF signals to transceiver 13 and receives RF signals from the transceiver without using antenna 14, for example, by using a cable 15 connected between master unit 12 and transceiver 13. Preferably, when signals are transferred using antenna 14, master CELL unit 12 is positioned so that the path between the unit and antenna 14 is as short as possible, in order to optimize the signal-to-noise value. Further preferably, transceiver 13 and/ or master unit 12 comprise one or more rake receivers when the cellular telephone system operates with CDMA signals.

Master CELL unit 12 receives the master RF signal and down-converts the signal to a forward intermediate frequency (IF-FWD) signal, so that master CELL unit 12 functions as a frequency conversion unit. The downconversion is performed using a local oscillator signal generated in unit 12, which signal has a frequency compatible with the frequency band within which unit 12 is operating. For example, if master CELL unit 12 operates at 820 MHz to 880 MHz, the local oscillator frequency could be set at 750 MHz. (The local oscillator signal in master unit 12 is also used for upconversion within the unit, as described in more detail below.) The IF-FWD signal and a reference to the local oscillator signal are transferred via one or more cables 20 to one or more slave CELL units 18, wherein the IF-FWD signal is up-converted to a "recovered" master RF CELL signal corresponding to the RF CELL signal received by master CELL unit 12. Slave CELL units 18 thus also function as frequency conversion units. When there is more than one slave CELL unit, the units are preferably connected to cables 20 in one or more "daisy-chain" topologies 23. Alternatively, the units may be connected in one or more star topologies 27, or in one or more daisy-chain-star hybrid topologies 29. The topology is preferably chosen according to installation requirements of system 10 and building 16. Slave CELL units 18 are positioned within building 16, which acts as an electromagnetic barrier substantially closing off RF signals from transceiver 13 from the interior of the building, so as to radiate the recovered master RF CELL signal within the building.

A patent application entitled "Split Repeater," filed Oct. 29, 1999, which is assigned to the assignee of the present invention and whose disclosure is incorporated herein by reference, describes a cellular repeater which down-converts an RF signal to an IF signal, then up-converts the IF signal to recover the RF signal. Examples of frequencies that are used in the process of conversion are given in the application, which frequencies may also be used in the present invention.

Each slave CELL unit 18 is coupled to one or more slave CELL antennas 22, and the recovered RF signal is radiated by the one or more slave CELL antennas 22 and is received by a CELL transceiver 25, most preferably comprised in a mobile CELL telephone, although any other suitable transceiver could be used. Slave CELL units 18 are most preferably positioned within building 16 so that the recovered master RF CELL signal is receivable within the building by CELL transceiver 25. As described in more detail below, DC power generated to drive master CELL unit 12 is preferably also transferred as a DC bias level via cables 20 to drive slave CELL units 18. Cables 20 are preferably standard coaxial cables, although any other cables capable of transferring the signals and bias level generated within master CELL unit 12 and slave CELL units 18 may be used.

One or more antennas 22 of one or more slave units 18 also receive a slave CELL RF signal from CELL transceiver 25, The slave CELL RF signal is down-converted to a reverse intermediate frequency (IF-REV) signal by the one or more slave units 18 receiving the RF signal. The IF-REV signal is transferred via cables 20 to master unit 12, wherein the IF-REV signal is up-converted to a recovered slave CELL RF signal, which is then transferred to transceiver 13, as described hereinabove. The operations of CELL master unit 12 and of one of CELL slave units 18 are explained in detail hereinbelow.

Figure 2:
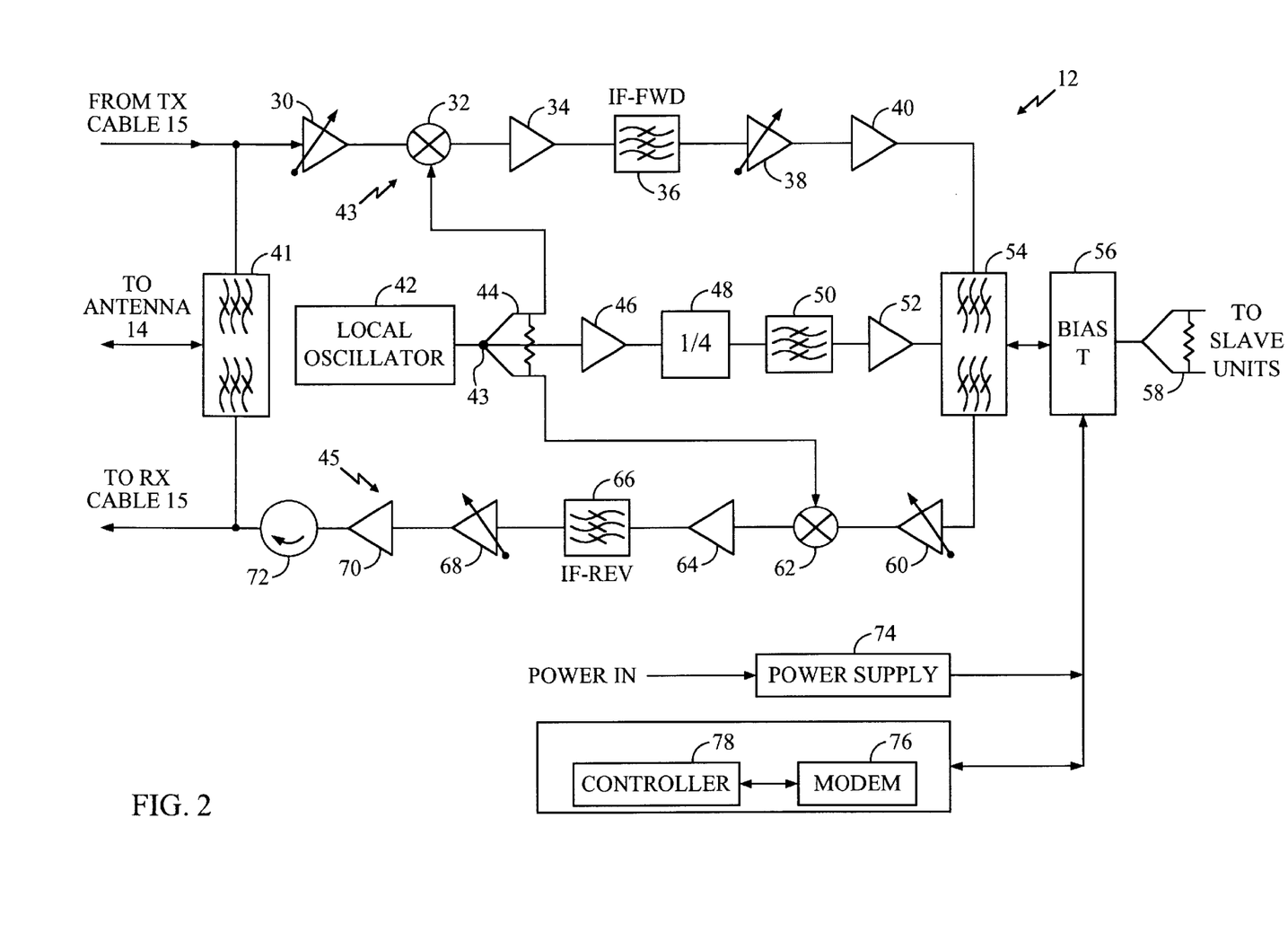
FIG. 2 is a schematic block diagram of a cellular master unit comprised in the system of FIG. 1, according to a preferred embodiment of the present invention.

FIG. 2 is a schematic block diagram of master CELL unit 12, according to a preferred embodiment of the present invention. An RF duplexer 41 eceives the master RF signal from transceiver 13 via antenna 14, as described above. Duplexer 41 acts as a port and separates a path 43 of the master signal from a path 45 of the received slave signal, by methods which are known in the art. Alternatively, the master RF signal is received via cable 15, as is also described above. The master RF signal is transferred to a low noise variable gain RF amplifier 30. Amplifier 30 acts as a first stage of amplification in path 43, and is most preferably constructed from very-low-noise components, as are known in the art.

The amplified signal from amplifier 30 is input to a mixer 32. Mixer 46 also receives a local oscillator (LO) signal, preferably generated by a temperature controlled crystal oscillator or alternatively by a non-stabilized oscillator. The oscillator and a frequency synthesizer act as a local oscillator 42, which transfers the LO signal to mixer 46 via a splitter 44. Preferably, a controller 78 sets the frequency generated by local oscillator 42. Mixer 32 uses the local oscillator signal to generate mixed signals comprising intermediate frequency (IF) side-bands, which mixed signals are amplified in a second-stage amplifier 34. The amplified mixed signals are then filtered in a band-pass filter 36 which passes one intermediate frequency band centered on a frequency herein termed IF-FWD, and rejects other bands generated in mixer 32. Preferable choices for the local oscillator frequency, and the corresponding IF-FWD frequency, are described in the above referenced patent application.

The output of filter 36 is input to a variable-gain amplifier 38 and a power amplifier 40, which together adjust a level of the IF-FWD signal according to requirements of the topology of the slave units installed in building 16, and according to requirements of a link budget of system 10. The adjusted signal is input to a triplexer 54. Preferably, the gain of amplifier 38 is set by controller 78.

Preferably, local oscillator 42 also supplies a local oscillator (LO) signal via splitter 44 and a buffer amplifier 46 to a frequency divider 48, which divider is set to divide the frequency by an integer, which is typically in the range 2–16, although any other suitable value could be used. The divided local oscillator (LO) signal is filtered to remove noise introduced by the division in a narrow band-pass filter 50, and is input to an amplifier 52. Amplifier 52 amplifies the received signal and transfers its output as a reference signal operating at a reference frequency to triplexer 54. Triplexer 54 combines the amplified LO reference signal and the adjusted IF-FWD signal, and transfers the combined signal to a bias-T filter 56.

Bias T filter 56 acts as a port and as a low-pass filter which biases the combined signal from triplexer 54 with a DC level generated by a power supply 74. The DC level generated by supply 74 drives master unit 12. Preferably, power supply 74 receives its driving power in the form of standard AC line power. Alternatively, power supply 74 receives its driving power in any other suitable standard form, such as from a battery. Filter 56 transfers the combined signal at the DC bias level to a splitter 58, which splits the signal into two paths, each path comprising at least one cable 20 and one slave unit 18. Thus each slave unit 18 receives the signal and the DC power from splitter 58.

Master unit 12 receives the IF-REV signal generated in slave units 18 via cables 20 and bias-T filter 56. The bias-T separates the signal from the DC level present in the cable, and the AC component, i.e., the IF-REV signal, is transferred to triplexer 54. Triplexer 54 directs the IF-REV signal along path 45 of unit 12, to a variable-gain amplifier 60 which amplifies the IF-REV signal to a level determined by the link budget of system 10. Mixer 62 mixes the IF-REV signal from amplifier 60 and the LO signal from splitter 44 to recover a slave RF signal received by one of the slave units 18. The recovered slave RF signal is amplified in an amplifier 64 and then filtered in a band-pass filter 66. The filtered amplified signal is then amplified in a variable-gain amplifier 68 and a power amplifier 70 before transferring via an isolator 72 to duplexer 41. The gain of amplifier 68 is preferably set by controller 78, so that the signal output from isolator 72 is at a suitable level for onward transmission from duplexer 41. Alternatively, the signal output from isolator 72 is transmitted to transceiver 13 via cable 15. Most preferably, gains of the variable-gain amplifiers of master unit 12 described hereinabove are adjusted so that the overall signal gain, from port to port, for path 43 and for path 45 is of the order of 10–60 dB for each path.

In a preferred embodiment of the present invention, controller 78 is able to control and/or monitor the operation of the one or more slave CELL units 18, by transferring control signals to the slave units on cables 20. Most preferably, the control signals are in the form of a frequency and/or a phase and/or an amplitude modulated signal, such as a frequency shift key (FSK) signal, as are known in the art. Preferably, master CELL unit 12 comprises a modem 76 which is coupled to controller 78, and the control signals are transferred to the slave units via the modem and filter 56.

Figure 3:
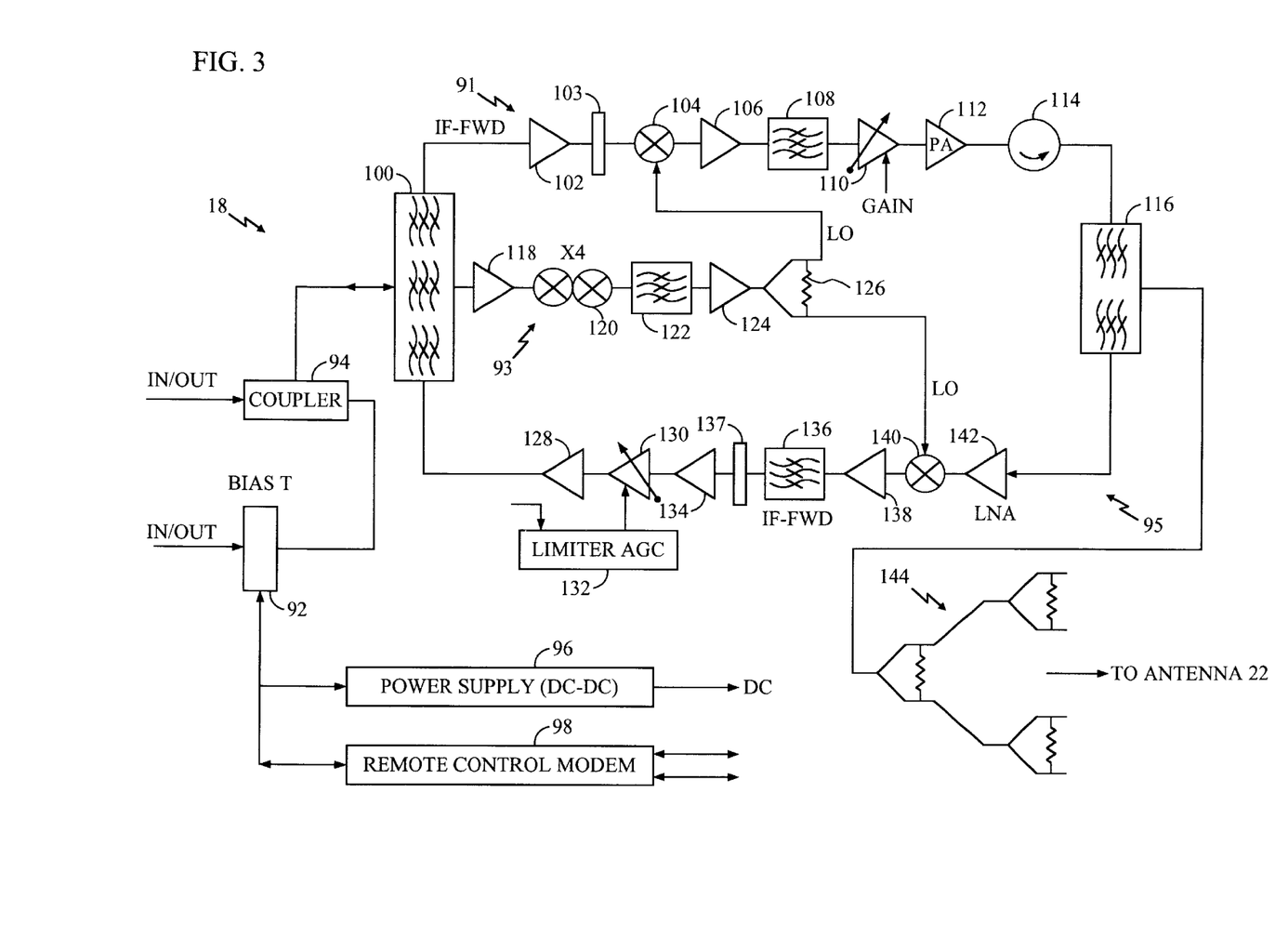
FIG. 3 is a schematic block diagram of a cellular slave unit comprised in the system of FIG. 1, according to a preferred embodiment of the present invention.

FIG. 3 is a schematic block diagram of one of slave CELL units 18, according to a preferred embodiment of the present invention. Each slave CELL unit 18 comprises a bias-T filter 92 and a coupler 94, which together receive the IF-FWD signal, the local oscillator reference signal, i.e., the divided local oscillator signal, and the DC level from master unit 12 via cables 20. Bias-T filter 92 and coupler 94 are also able to transfer signals between other slave units connected to cables 20 and master unit 12. Most preferably, coupler 94 and filter 92 are arranged so that coupling or decoupling one of slave units 18 from cables 20 does not significantly affect operation of the other slave units 18.

Filter 92 acts as a port, splitting off the DC level to power each slave unit 18 either directly or via an optional DC-DC power supply 96, and transferring the AC signals received from master unit 12 via coupler 94 to a triplexer 100. Triplexer 100 filters and separates the AC signals into the IF-FWD signal which follows a forward path 91, and the divided local oscillator signal which follows a path 93. Path 93 comprises a frequency multiplier 120, which multiplies the frequency of the divided local oscillator signal, after amplification in a pre-amplifier 118, by the same integer value used by divider 48 of master unit 12. Thus a local oscillator signal is reconstituted in each slave unit 18, which signal has a frequency identical to that of the local oscillator signal originally synthesized by local oscillator 42 of master unit 12. The reconstituted local oscillator signal is filtered in a band-pass filter 122 to remove noise produced by the multiplication, and amplified in an amplifier 124. The amplified reconstituted LO signal is input to a splitter 126, and from the splitter the signal is input to a mixer 104 and a mixer 140. The power level of the LO signal input to the splitter is preferably set as required to drive mixers 104 and 140.

Path 91 comprises a preamplifier 102, which receives frequencies centered on IF-FWD from triplexer 100, and amplifies the IF-FWD signal before it is input to a variable delay 103. Delay 103 preferably comprises a surface acoustic wave delay which delays signals in path 91 by a time of the order of 500 ns. Most preferably, the time delay is set to be at least half a chip rate of CDMA signals received by unit 12. The time delay provided by delay 103 is preferably set on installation of each unit 18, or alternatively the time delay is set by a remote control modem 98, whose function is described in more detail below. Most preferably, the time delay provided by delay 103 for each respective unit 18 in system 10 is set to be different. Thus, CDMA pilot signals received by transceiver 25 will be delayed by different times, so avoiding possible destructive interference of transmitted pilot signals, and thus improving the overall reception of the pilot signals.

The signal from delay 103 is input to mixer 104. Mixer 104 up-converts the IF-FWD signal received, using the reconstituted local oscillator signal, to regenerate the master RF signal received by master unit 12. The regenerated RF signal is amplified in an RF amplifier 106 and filtered in band-pass filter 108, which together prepare an RF signal at a level suitable for inputting to a variable-gain amplifier 110 and an RF power amplifier 112. Power amplifier 112 generates an RF power output signal corresponding to the original master signal received by master unit 12, which power signal is transferred via an isolator 114 to increase the voltage standing wave ratio. The power signal is input to an RF duplexer 116 which acts as a port. Duplexer 116 routes the power signal to a four-way splitter 144, to which up to four slave antennas 22 are coupled and which radiate the RF power signal.

As explained above, antennas 22 also receive a slave RF signal. The slave signal is routed via RF duplexer 116 along a reverse path 95 to a low noise pre-amplifier 142, which pre-amplifier is most preferably constructed from very-low-noise components by methods known in the art. A mixer 140 uses the reconstituted local oscillator signal received from splitter 126 and the output signal of pre-amplifier 142 to down-convert the slave RF signal to the intermediate frequency signal IF-REV. The IF-REV signal is amplified by an amplifier 138 feeding a band-pass filter 136, which together operate to generate an IF-REV signal substantially free from unwanted sidebands, such as those produced in mixer 140.

The IF-REV signal output of filter 136 is preferably output to a variable delay 137. Delay 137 preferably comprises a surface acoustic wave delay which delays signals in path 95 by a time of the order of 2 ms. The time delay provided by delay 137 is preferably set on installation of each unit 18, or alternatively the time delay is set by remote control modem 98. Most preferably, the time delay provided by delay 137 for each respective unit 18 in system 10 is set to be different. As explained in more detail below, the time delay provided by each respective delay 137 is used to provide diversity in signals received by units 18. The signal from delay 137 is routed through an amplifier 134, a variable-gain amplifier 130, and a power amplifier 128 to triplexer 100.

Alternatively, delay 137 is not present in unit 18, and the IF-REV signal output of filter 136 is routed directly to amplifier 134. The output of amplifier 128 is sampled by an automatic gain control (AGC) circuit and is used to adjust the gain of variable-gain amplifier 130, so that the level of the amplified IF-REV signal is maintained at a level consistent with the link budget. Triplexer 100 routes the output of amplifier 128 via coupler 94 to cables 20, wherein it is transmitted to master unit 12.

Preferably, remote control modem 98 is able to receive and decode control signals originating from master unit 12, as described above. Most preferably, the control signals are utilized to set and/or read parameters of elements within slave unit 18, such as the gains of amplifiers 110 and 130 and the delay time of delay 103, and/or levels of signals within the slave unit. Preferably, parameters affecting the operation of each slave unit 18, such as gains of amplifiers 110 and 130, are preset when each slave unit 18 is set up, so that each slave unit 18 is able to operate independently. Most preferably, the overall signal gain, from port to port, for path 91 and for path 95 is set to be of the order of 10–60 dB for each path.

Returning to FIG. 1, it will be appreciated that all the slave CELL units of system 10 operate on substantially one local oscillator frequency, as provided by the local oscillator in master CELL unit 12, which also operates on the same local oscillator frequency. The local oscillator frequency is first divided by an integer, and the divided LO frequency is transferred throughout the system to the slave units. Within each slave unit the divided LO frequency is multiplied by the integer, to reconstitute the original local oscillator frequency. The process of division by an integer, then multiplication by the integer, ensures that the reconstituted frequency is substantially identical to the frequency generated by the local oscillator, and that any drift in the local oscillator frequency is substantially exactly reproduced in the slave units. Thus, regardless of the occurrence of any drift, since the same local oscillator frequency is used for down-converting and up-converting, the recovered LO frequency is substantially identical to the original LO frequency.

In some preferred embodiments of the present invention, at least some of elements 36, 41, 54, and 66 of master unit 12 (FIG. 2) are constructed so that only specific predetermined cellular channel frequencies are transmitted on path 43 and on path 45, and other cellular channel frequencies are not transmitted. Most preferably, at least some of elements 100, 108, 116, and 136 of each slave unit 18 (FIG. 3) are constructed so that the corresponding cellular channel frequencies are transmitted on path 91 and path 95. Thus master unit 12 and slave units 18 operate as a channelized communication repeater system.

Figure 4:
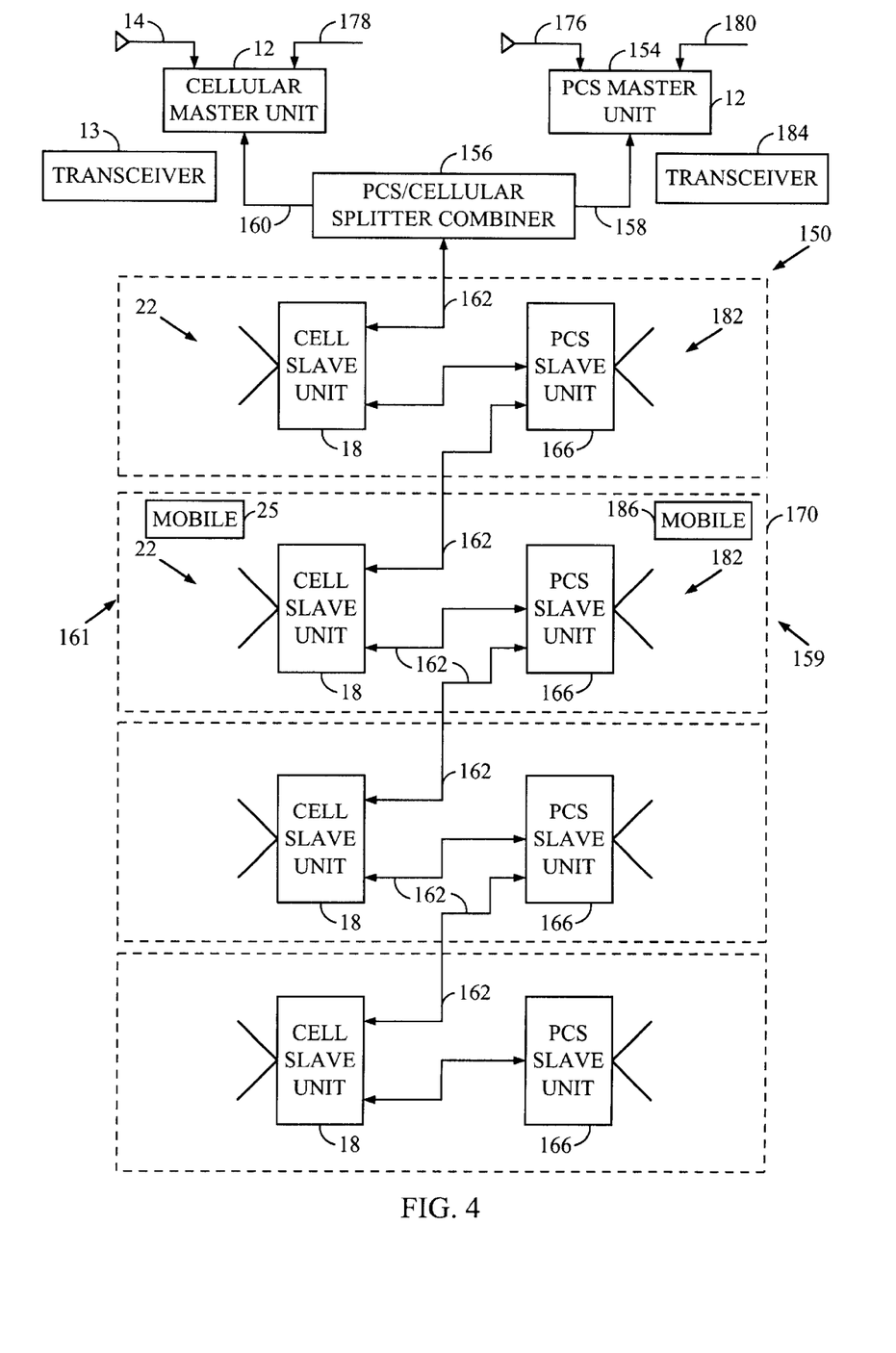
FIG. 4 is a schematic block diagram of a repeater system installed in a building, according to an alternative preferred embodiment of the present invention.

FIG. 4 schematically illustrates a repeater system 150 installed in a building 170, according to an alternative preferred embodiment of the present invention. Apart from the differences described below, the operation of system 150 is generally similar to that of system 10 (FIG. 1), so that elements indicated by the same reference numerals in both systems 10 and 170 are generally identical in construction and in operation. System 150 comprises CELL master unit 12 and CELL master antenna 14, which transmit and receive RF CELL signals from transceiver 13, and which communicate with CELL slave units 18, substantially as described above for system 10.

In addition, system 150 comprises a master personal communications system (PCS) unit 154 and a master PCS antenna 176, which transmit and receive RF PCS signals from a transceiver 184, and which communicate with a plurality of PCS slave units 166. Master PCS unit 154 and master PCS antenna 176 operate generally as master CELL unit 12 and master CELL antenna 14, as described above with reference to FIG. 2, except that master PCS unit 154 and master PCS antenna 176 operate at frequencies different from those of master CELL unit 12 and master CELL antenna 14. Alternatively, master CELL unit 12 transmits and receives signals from transceiver 13 via a cable 178 and/or master PCS unit 154 transmits and receives signals from transceiver 184 via a cable 180. PCS slave units 166 operate generally as CELL slave units 18, as described above with reference to FIG. 3, except that PCS slave units 166 operate at frequencies different from those of CELL slave units 18.

Preferably, master PCS unit 154 and PCS antenna 176 receive a master PCS signal from transceiver 184 at a frequency compatible with a personal communications system, for example, in a frequency band from approximately 1800 MHz to 1900 MHz, although transceiver 184 could operate in any other frequency band. Most preferably, a PCS local oscillator signal for master PCS unit 154 is chosen to have a frequency compatible with the frequency band within which the unit is operating, for example 1700 MHz.

The PCS LO signal is mixed with the master PCS signal to generate an IF-FWD PCS signal. As described above with reference to master CELL unit 12, the frequency of the PCS LO signal is divided by an integer, herein termed the PCS integer, to generate a divided PCS LO signal. The PCS integer may be different from the integer used in unit 12, herein termed the CELL integer. Also as described above with reference to master CELL unit 12, PCS control signals to control and/or monitor the operation of slave units 166 are generated within master PCS unit 154 The divided PCS LO signal, the IF-FWD PCS signal, and the PCS control signals are transmitted, substantially as described above with reference to master CELL unit 12, to one or more PCS slave units 166.

PCS slave units 166 operate generally as CELL slave units 18, as described above with reference to FIG. 3, except that the PCS slave units operate at frequencies compatible with signals transmitted from PCS master unit 154. Thus, PCS slave units 166 regenerate the PCS local oscillator frequency by multiplying the frequency of the divided PCS LO signal by the PCS integer. The regenerated PCS local oscillator signal is mixed with the PCS IF-FWD signal received from PCS master unit 154 to regenerate the PCS master RF signal. PCS slave units 166 are coupled to one or more PCS slave antennas 182, so that the units and associated antennas are able to transmit and receive PCS signals from a PCS slave transceiver 186. Thus, a slave PCS RF signal received by a specific PCS slave unit 166 is mixed with the regenerated PCS local oscillator signal to produce an IF-REV PCS signal.

As described above with reference to slave unit 18, PCS slave units 166 receive the PCS control signals transmitted by PCS master unit 34. Most preferably, PCS slave units 166 are powered, in substantially the same manner as CELL slave units 18, by a DC bias level generated in master CELL unit 12.

CELL master unit 12 is coupled via a coaxial cable 160 to a splitter/combiner 156, which is described in more detail below. PCS master unit 154 is also coupled via a coaxial cable 158 to splitter/combiner 156. Splitter/combiner 156 is in turn coupled via one or more coaxial cables 162 to one or more CELL slave units 18 and to one or more PCS slave units 166, most preferably in one of the topologies described hereinabove for system 10.

Figure 5:
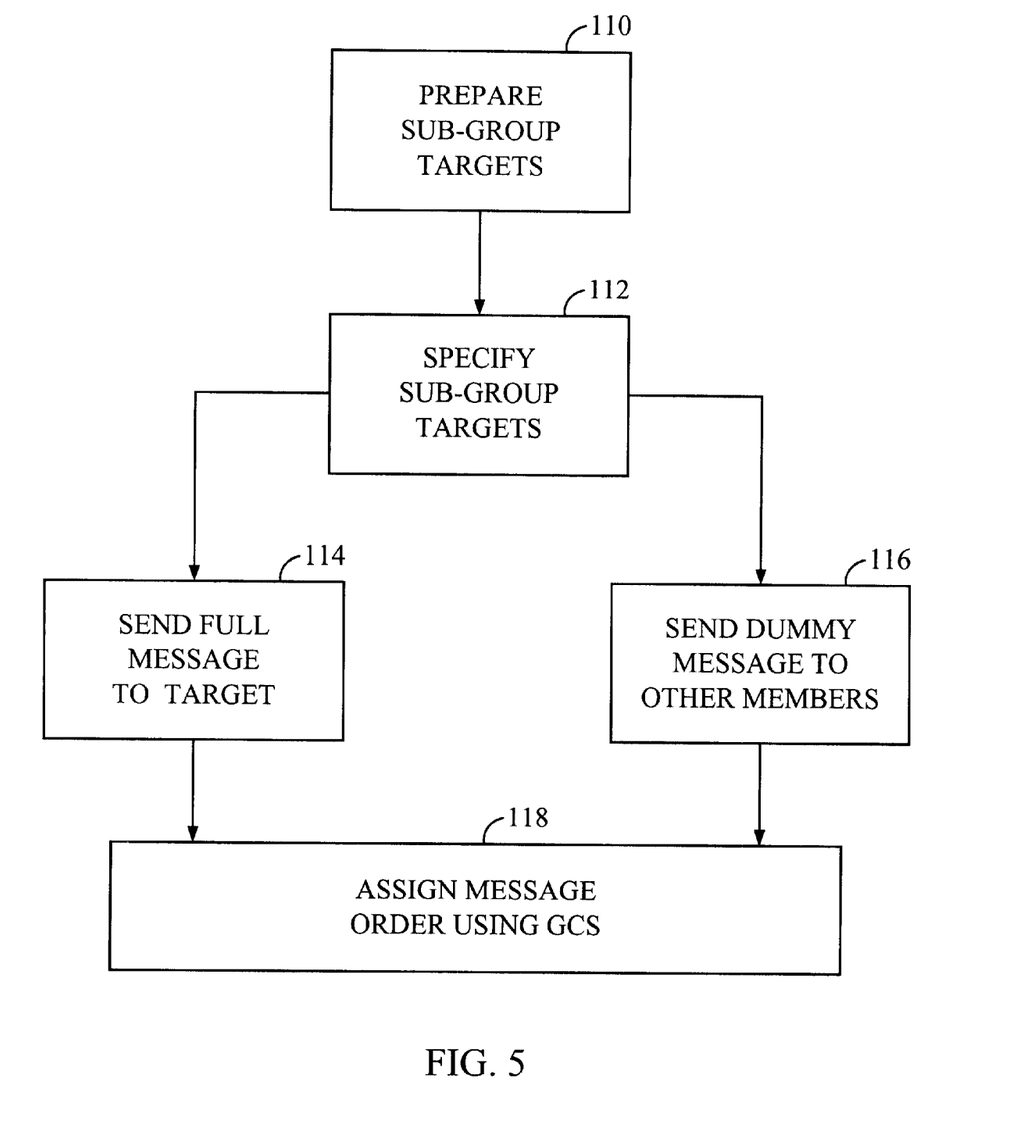
FIG. 5 is a schematic diagram showing signals passing through a splitter/combiner comprised in the system of FIG. 4, according to a preferred embodiment of the present invention.

FIG. 5 is a schematic diagram showing signals passing through splitter/combiner 156, according to a preferred embodiment of the present invention. Splitter/combiner 156 preferably comprises one or more band-pass filters operating in the frequency bands of the signals passed by the splitter/combiner, as is known in the art. Splitter/combiner 156 effectively routes signals from CELL slave units 18 to CELL master unit 12, and vice versa, and also routes signals from PCS slave units 166 to PCS master unit 154, and vice versa. Thus, on cable 160 splitter/combiner 36 receives the divided CELL LO signal, the IF-FWD CELL signal, the CELL control signals, and the DC bias level from CELL master unit 12 and transfers the signals and the bias level to cable 162. Similarly, on cable 158 splitter/combiner 156 receives the divided PCS LO signal, the IF-FWD PCS signal and the PCS control signals from PCS master unit 154 and transfers the signals to cable 162. On cable 162 splitter/combiner 156 receives the IF-REV CELL signal and responses to the CELL control signals from slave CELL units 18, and transfers the signals to cable 160. Similarly, on cable 162, splitter/combiner 156 receives the IF-REV PCS signal and responses to the PCS control signals from slave PCS units 166, and transfers the signal to cable 158.

Returning to FIG. 4, it will be appreciated that CELL master unit 12, cable 160, splitter/combiner 156, cables 162, and CELL slave units 18 form a CELL group of communication elements 161 which operate substantially as system 10 at cellular frequencies. Similarly, PCS master unit 154, cable 158, splitter/combiner 156, cables 162, and PCS slave units 166 form a PCS group of communication elements 159 which operate substantially as system 10 at personal communication system frequencies.

Most preferably, when CELL slave units 18 and PCS slave units 166 are installed in system 150, the units are installed within building 170 so that substantially all of the interior of the building is able to receive cellular and personal communication system signals. Optionally, the units are installed in pairs, so that a CELL slave unit and a PCS slave unit are located physically close to one another. It will be appreciated that since the slave units are installed as described above for system 10, all the slave units may be powered via coaxial cables 162, substantially from power which is generated for driving CELL master unit 12. As explained above with reference to FIG. 3, most preferably the design of the slave units facilitates coupling or decoupling of one or more slave units from coaxial cables 162, substantially without affecting the operation of slave units which remain coupled to cables 162.

It will be appreciated that all the CELL slave units of group 161 operate on substantially one CELL local oscillator frequency, as provided by the local oscillator in CELL master unit 12, which also operates on the same CELL local oscillator frequency. Furthermore, all the PCS slave units of group 159 operate on substantially one PCS local oscillator frequency, as provided by the local oscillator in PCS master unit 154, which also operates on the same PCS local oscillator frequency.

Figure 6:
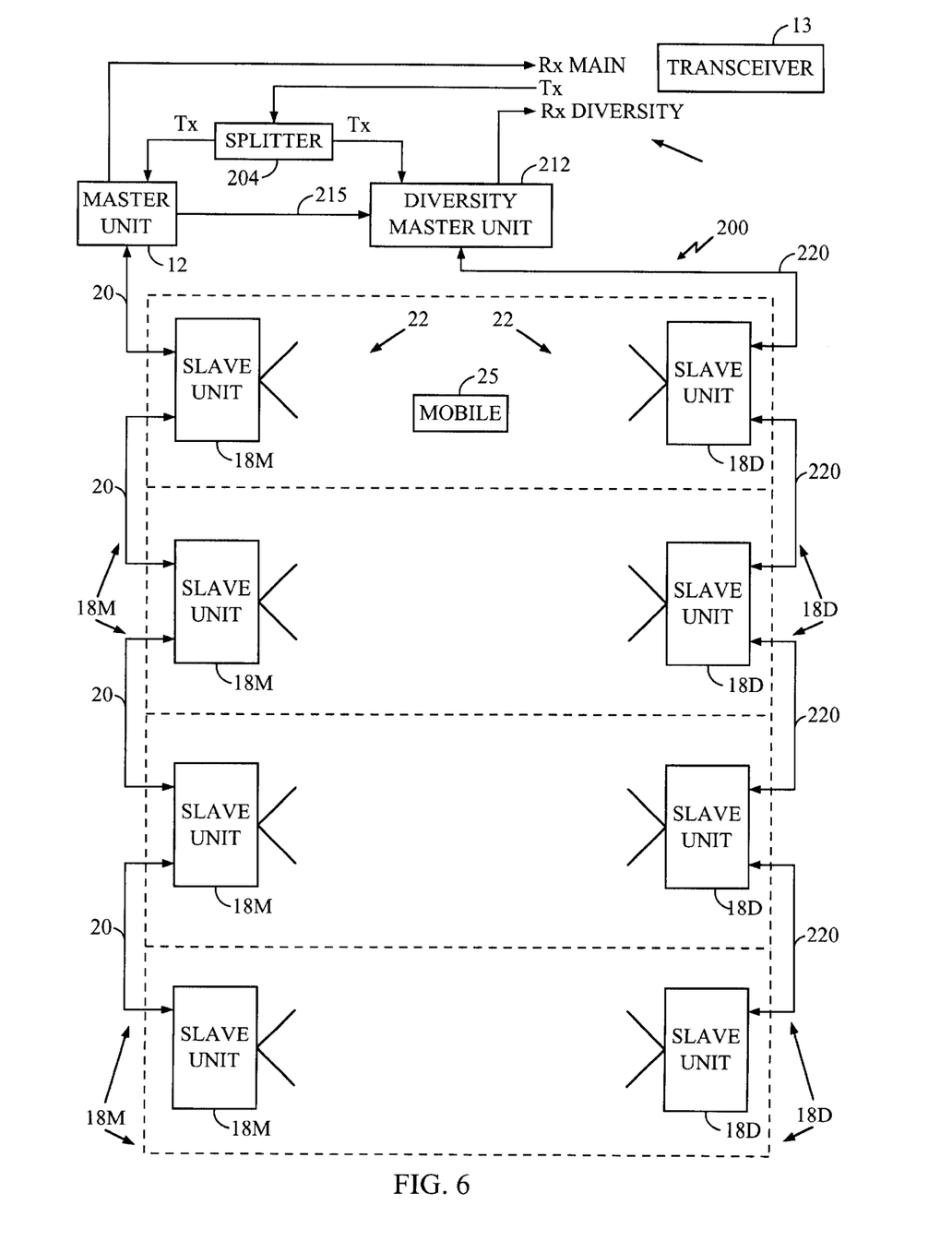
FIG. 6 is a schematic block diagram showing a repeater system installed in a building, according to a further alternative preferred embodiment of the present invention.

FIG. 6 is a schematic block diagram showing a repeater system 200 using receive diversity, according to an alternative preferred embodiment of the present invention. Apart from the differences described below, the operation of system 200 is generally similar to that of system 10 (FIG. 1), so that elements indicated by the same reference numerals in both systems 10 and 200 are generally identical in construction and in operation. System 200 is installed in a building 202. Master unit 12 receives IF-REV signals from a plurality of slave units 18M installed in building 202 via cables 20, in response to RF signals received by the slave units from transceiver 25, substantially as described above for system 10. Each slave unit 18M is substantially identical in construction and operation to slave unit 18, and the suffix M is used herein to indicate slave units coupled to master unit 12. The IF-REV signals received from slave units 18M are converted in master unit 12 to recovered RF signals. The recovered RF signals are transmitted to transceiver 13 as receive main signals, preferably via cable 15, or alternatively over the air via antenna 14.

System 200 comprises a diversity master unit 212, which operates generally similarly to master unit 12, and whose construction and operation is described in detail below. Diversity master unit 212 is connected by a plurality of cables 220, in a daisy chain or other topology as described above with reference to system 10, to a plurality of slave units 18D. Each slave unit 18D is substantially identical in construction and operation to slave unit 18, and the suffix D is used herein to indicate slave units coupled to diversity master unit 212. It will be appreciated that since repeater system 200 comprises separate sets of slave units 18M and 18D, there will be an improvement in overall system noise figure of up to 3 dB compared to a similar system where the slave units are not separated.

Most preferably, slave units 18M and slave units 18D are separated sufficiently in position so that signals received by the separate sets of slave units are distinguishable, i.e. so that the separate signals can be used as main receive signals and diversity receive signals respectively. Most preferably, delay 137 (FIG. 3) is present in each slave unit 18D and each slave unit 18M and is set to be an integer multiple of a delay period of the order of 2 ms, so that signals received by the slave units can incorporate time diversity. Thus, signals received by slave units 18D and slave units 18M incorporate position diversity or time diversity or a combination of position and time diversity.

A cable 215 connects master unit 12 and diversity master unit 212, which cable is used to transfer the local oscillator signal from master unit 12 to diversity master unit 212. Alternatively, cable 215 transfers the divided local oscillator signal from master unit 12 to diversity master unit 212, wherein the local oscillator signal having the local oscillator frequency is regenerated, as described hereinbelow. Diversity master unit 212 receives IF-REV signals from its respective slave units 18D via cables 220, in response to RF signals received by the slave units from transceiver 25. The IF-REV signals received from slave units 18D are converted in master unit 212 to recovered RF signals, which recovered RF signals are transmitted to transceiver 13, substantially as described above for system 10, as receive diversity signals. Thus system 200 utilizes master unit 12 and its respective slave units 18M to provide receive main RF signals, and utilizes diversity master unit 212 and its respective slave units 18D to provide receive diversity RF signals, so that coverage within building 202 is enhanced compared to systems which do not use diversity.

Most preferably, system 200 comprises a two-way splitter 204 which supplies transmit RF signals from transceiver 13 to master unit 12 and diversity master unit 212. As described above with respect to system 10, master unit 12 and diversity master unit 212 convert the RF signals to IF-FWD signals, and transfer the IF-FWD signals to their respective sets of slave units 18M and slave units 18D.

In some preferred embodiments of the present invention, diversity master unit 212 operates and is constructed substantially as described above for master unit 12 (FIG. 2), apart from the differences described hereinbelow. Diversity master unit 212 does not utilize local oscillator 42, and the local oscillator may be absent from unit 212. Instead of using local oscillator 42, the local oscillator signal from main master unit 12 is transferred as a reference by cable 215 to a feed point 43 on splitter 44, which acts as a receiver to recover the local oscillator signal. The recovered local oscillator signal is utilized substantially as described above for the generated local oscillator signal of master unit 12.

Figure 7:
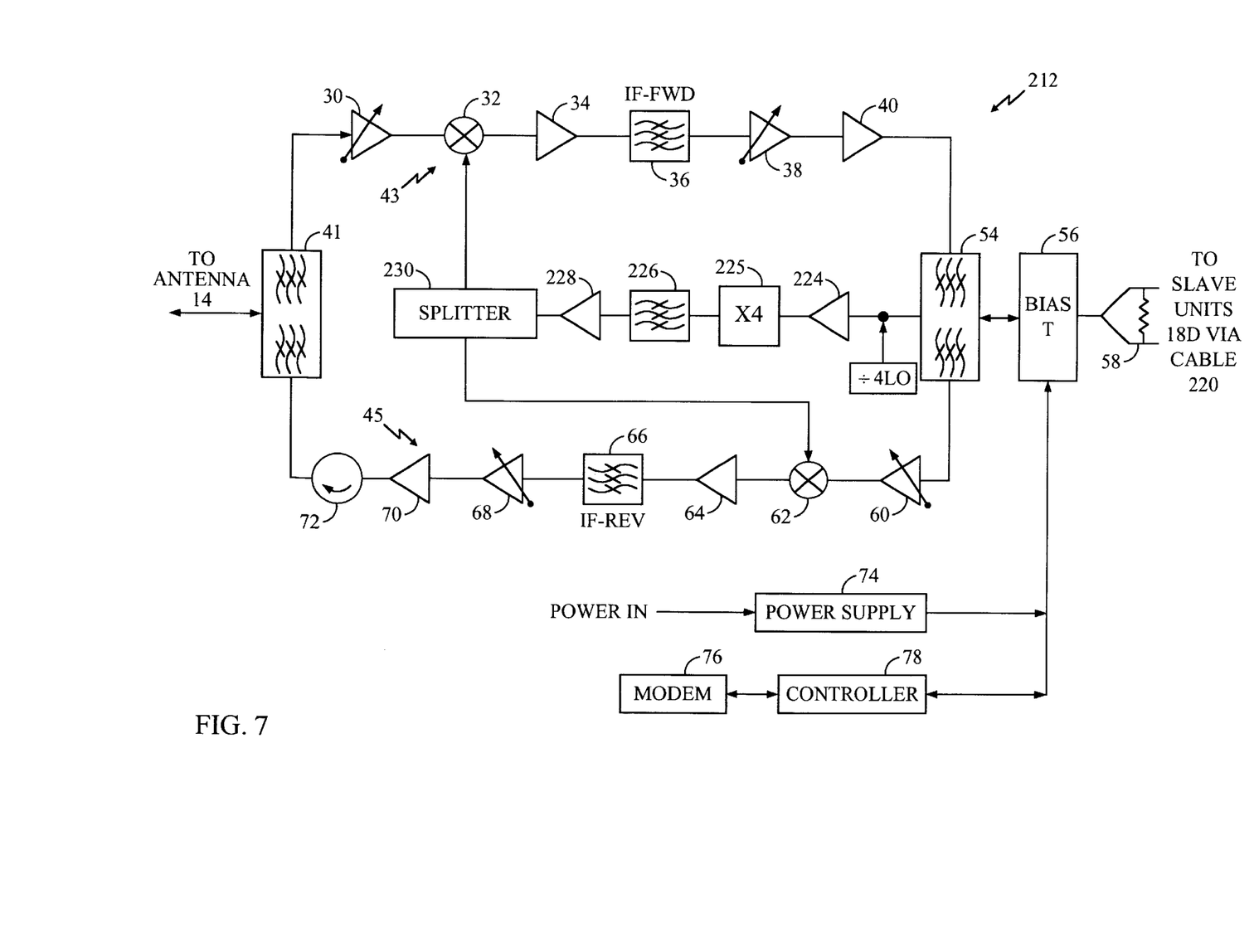
FIG. 7 is a schematic block diagram of a diversity master unit comprised in the system of FIG. 6, according to a preferred embodiment of the present invention.

FIG. 7 is a schematic block diagram of diversity master unit 212, according to an alternative preferred embodiment of the present invention. Apart from the differences described below, the operation of unit 212 is generally similar to that of unit 12 (FIG. 2), so that elements indicated by the same reference numerals in both units 12 and 212 are generally identical in construction and in operation. To provide a local oscillator signal, diversity unit 212 receives the divided LO signal as a reference from master unit 12 via cable 215. The divided LO signal is input to triplexer 54, and the signal is conveyed, as described above for master unit 12, to slave units 18D via cables 220. The divided LO signal is also input to an amplifier 224, and the output of the amplifier is input to a multiplier 225. Multiplier 225 multiplies the frequency of the amplified divided LO signal by the same integer as used in master unit 12 to produce the divided LO signal, so that the original LO frequency is recovered as an output of the multiplier. The multiplier output is filtered in a band-pass filter 226 to remove harmonics generated in the multiplier, and the filtered output is amplified in an amplifier 228 and then split in a two-way splitter 230 which thus acts as a receiver that recovers the local oscillator signal. The outputs from splitter 230 are thus signals with the original LO frequency.

One of the outputs from splitter 230 is input to mixer 32 in path 43, and the other output is input to mixer 62 in path 45. The operation of paths 43 and paths 45 is substantially as described above for master unit 12.

Figure 8:
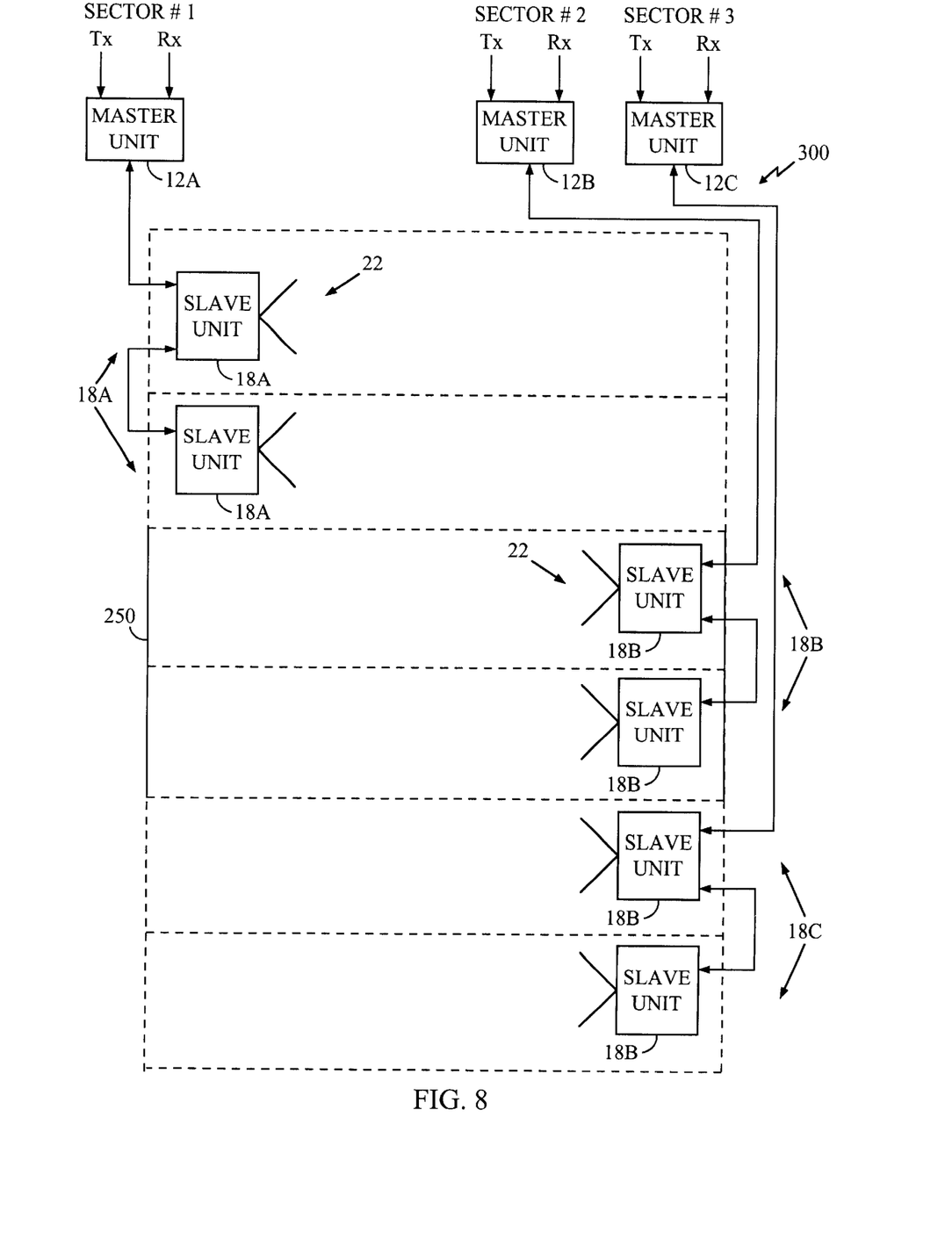
FIG. 8 is a schematic block diagram showing a repeater system installed in a building, according to an alternative preferred embodiment of the present invention.

FIG. 8 is a schematic block diagram showing a repeater system 300 installed in a building 250, according to an alternative preferred embodiment of the present invention. Apart from the differences described below, the operation of system 300 is generally similar to that of system 10 (FIG. 1), so that elements indicated by the same reference numerals in both system 300 and system 10 are generally identical in construction and in operation. Building 210 is preferably a relatively large building such as a multi-story building wherein communication coverage of the whole interior of the building is difficult because of the volume of communications within the building. In order to provide complete coverage for the whole building, a plurality of master units 12, herein termed master unit 12A, 12B, and 12C, are connected to respective pluralities of slave units 18, herein termed slave units 18A, 18B, and 18C, so that each respective plurality of slave units (and the corresponding master unit) covers a different section of the building. Most preferably, each respective master unit communicates with one sector of a base transceiver station, by methods which are known in the art, so that each sector of the base transceiver station provides coverage for a respective section of building 210. Within each section of building 10, operation of system 300 is substantially as described above for system 10.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Repeater apparatus for conveying a radio-frequency (RF) signal into an environment closed-off to the RF signal, comprising:
   a. a master transceiver unit, comprising:
      i. a master port which receives the RF signal;
      ii. a local oscillator (LO), which generates a LO signal at a LO frequency;
      iii. a frequency divider which divides the lo frequency of the lo signal by an integer to produce a divided LO signal; and
      iv. a master mixer coupled to the master port and the divider which generates an intermediate-frequency (IF) signal responsive to the RF signal and the LO signal;
   b. one or more slave transceiver units, each unit positioned within the environment closed-off to the RF signal and comprising:
      i. a frequency recovery circuit which generates a recovered LO signal at the LO frequency multiplying the frequency of the divided LO signal by the integer;
      ii. a slave mixer coupled to the multiplier which generates a recovered RF signal responsive to the recovered LO signal and the IF signal; and
      iii. a slave port coupled to the slave mixer which receives the recovered RF signal therefrom and transmits the recovered RF signal into the closed-off environment; and
      iv. an IF signal reverse path comprising a delay element;
   c. one or more cables coupled between the master transceiver unit and the one or more slave transceiver units which convey the IF signal and the divided LO signal between the master transceiver unit and the one or more slave transceiver units.

2. Apparatus according to claim 1, wherein the master port is a two-way port, and wherein each slave port is a two-way port through which the respective slave transceiver unit receives an RF slave signal from the closed-off environment and mixes the RF slave signal with the recovered LO signal to produce a slave IF signal which is conveyed by the one or more cables to the master transceiver unit, wherein a recovered slave RF signal is generated and is conveyed to the master port for transmission therefrom.

3. Apparatus according to claim 1, wherein the master transceiver unit comprises an antenna which receives the RF signal from a base transceiver station and transfers the received RF signal to the master port.

4. Apparatus according to claim 1, wherein the master port receives the RF signal via a cable coupled to a base transceiver station.

5. Apparatus according to claim 1, wherein each slave unit comprises one or more antennas coupled to the respective slave port which transmit the recovered RF signal into the closed-off environment.

6. Apparatus according to claim 1, wherein the master unit transceiver comprises a DC power supply which generates a DC level that is conveyed over the one or more cables to power the one or more slave transceiver units.

7. Apparatus according to claim 1, wherein the master unit transceiver comprises a controller which controls the operation of the master transceiver unit and the one or more slave transceiver units.

8. Apparatus according to claim 7, and comprising a remote control unit which transfers control signals between the controller and an operator of the apparatus.

9. Apparatus according to claim 7, wherein the controller generates modulated control signals which are conveyed by the one or more cables between the master transceiver unit and the one or more slave transceiver units.

10. Apparatus according to claim 1, wherein the apparatus operates in a cellular communications network at frequencies substantially in the range 800 MHz to 1900 MHz.

11. Apparatus according to claim 1, wherein the IF signal corresponds to one or more predetermined channels of a multiple-access communications network.

12. Apparatus according to claim 1, wherein the one or more slave transceiver units comprise a plurality of slave transceiver units coupled to the master transceiver unit in one or more daisy-chain topologies.

13. Apparatus according to claim 1, wherein the one or more slave transceiver units comprise a plurality of slave transceiver units coupled to the master transceiver unit in one or more star topologies.

14. Apparatus according to claim 1, wherein the one or more slave transceiver units comprise a plurality of slave transceiver units coupled to the master transceiver unit in one or more hybrid star-daisy-chain topologies.

15. Apparatus according to claim 1, wherein each slave transceiver unit comprises a respective IF signal forward path, wherein the forward path comprises a delay element which delays the IF signal in the forward path by a predetermined time.

16. Apparatus according to claim 1, wherein the frequency recovery circuit comprises a frequency multiplier.

17. A method for conveying a radio-frequency (RF) signal into an environment closed-off to the RF signal, comprising:

a. receiving the RF signal at a master port;
  b. providing a local oscillator (LO) signal operating at a LO frequency in a vicinity of the master port;
  c. dividing the LO frequency of the LO signal by an integer to produce a divided LO signal;
  d. generating an intermediate frequency (IF) signal responsive to the RF signal and the LO signal;
  e. conveying the IF signal and the divided LO signal to the closed-off environment;
  f. multiplying the frequency of the divided LO signal by the integer to generate a recovered LO signal having the LO frequency;
  g. mixing the recovered LO signal and the IF signal to generate a recovered RF signal;
  h. coupling the recovered RF signal to a slave port;
  i. transmitting the recovered RF signal into the closed-off environment from the slave port;
  j. receiving a slave RF signal from the closed-off environment at the slave port;
  k. mixing the slave RF signal and the LO signal to produce a slave IF signal;
  l. delaying the slave IF signal a predetermined amount;
  m. recovering the slave RF signal by mixing the slave IF signal with the LO signal; and
  n. transmitting the slave RF signal from the master port.

18. A method according to claim 17, wherein receiving the RF signal comprises receiving a cellular communications transmission at a frequency in the range 800 MHz to 1900 MHz.

19. A method according to claim 17, wherein generating the IF signal comprises producing an IF signal having a frequency substantially less than the frequency of the RF signal.

20. A method according to claim 17, wherein generating the IF signal comprises producing an IF signal having a frequency substantially less than the LO frequency.

21. A method according to claim 17, wherein generating the IF signal comprises producing an IF signal to correspond to one or more predetermined channels of a multiple-access communications network.

22. A method according to claim 17, wherein conveying the IF signal to the closed-off environment comprises delaying the IF signal by a predetermined time.

\* \* \* \* \*